United States Patent [19]

Miller

[11] Patent Number: 5,397,100

[45] Date of Patent: Mar. 14, 1995

[54] FLOW REFRIGERATION VALVE

[75] Inventor: Kent A. Miller, Hendersonville, Tenn.

[73] Assignee: Mueller Industries, Inc., Wichita, Kans.

[21] Appl. No.: 137,836

[22] Filed: Oct. 15, 1993

[51] Int. Cl.⁶ ............................................. F16K 5/20
[52] U.S. Cl. ................................... 251/188; 251/192
[58] Field of Search ....................... 251/161, 188, 192

[56] References Cited

U.S. PATENT DOCUMENTS

| | | |
|---|---|---|
| 1,126,395 | 1/1915 | Clark . |
| 1,134,811 | 4/1915 | Berger . |
| 1,185,789 | 6/1916 | Garbe . |
| 2,381,431 | 8/1945 | Bordo . |
| 3,653,631 | 4/1972 | Hurst . |
| 4,044,995 | 8/1977 | Kubota ................. 251/188 |
| 4,203,460 | 5/1980 | Priese . |
| 4,366,946 | 1/1983 | Roark . |
| 4,562,993 | 1/1986 | Lew . |
| 4,580,762 | 4/1986 | Hirtz et al. . |
| 5,205,535 | 4/1993 | Nevrekar . |

FOREIGN PATENT DOCUMENTS

| | | | |
|---|---|---|---|
| 2470325 | 6/1981 | France ................... | 137/874 |
| 209160 | 9/1965 | U.S.S.R. ................. | 251/161 |

*Primary Examiner*—John C. Fox
*Attorney, Agent, or Firm*—Harness, Dickey & Pierce

[57] ABSTRACT

A valve, such as a compressor or line service valve, for use in refrigeration or air conditioning fluid circuits having an improved flow for improved energy efficiency is disclosed. The valve incorporates a rotary ball member with a 90° fluid passage diameter that is equal to or greater than the diameter of the fluid line that it services. Rotation of a primary actuator stem rotates the ball member to open and close the valve. An annular ball seal provides a seat against which the ball may be positively sealed. A secondary stem is aligned on an alternate axis from the primary stem that is preferably collinear with a fluid line. The secondary stem effectuates a positive engagement between the rotary ball member and the ball seal. A plunger cooperates with locator indentations and a groove in the rotary ball member to center the ball within the valve and align its fluid passage with fluid line connectors. Locator indentations also ensure that the rotary ball member is properly oriented when in either the opened or closed positions. When the secondary stem is engaged, it effectuates a positive shut-off force to seal the ball member against the ball seal.

24 Claims, 4 Drawing Sheets

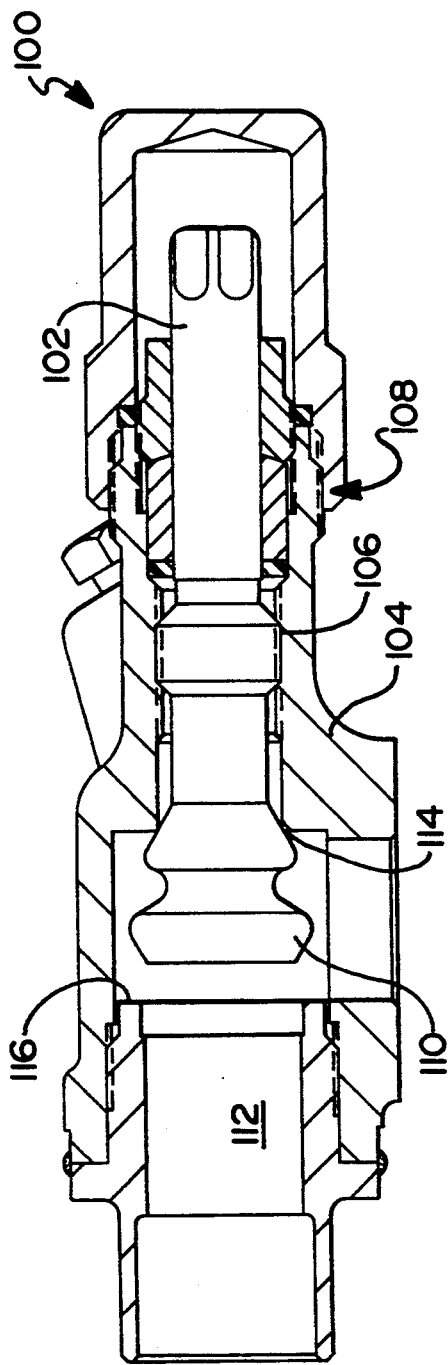
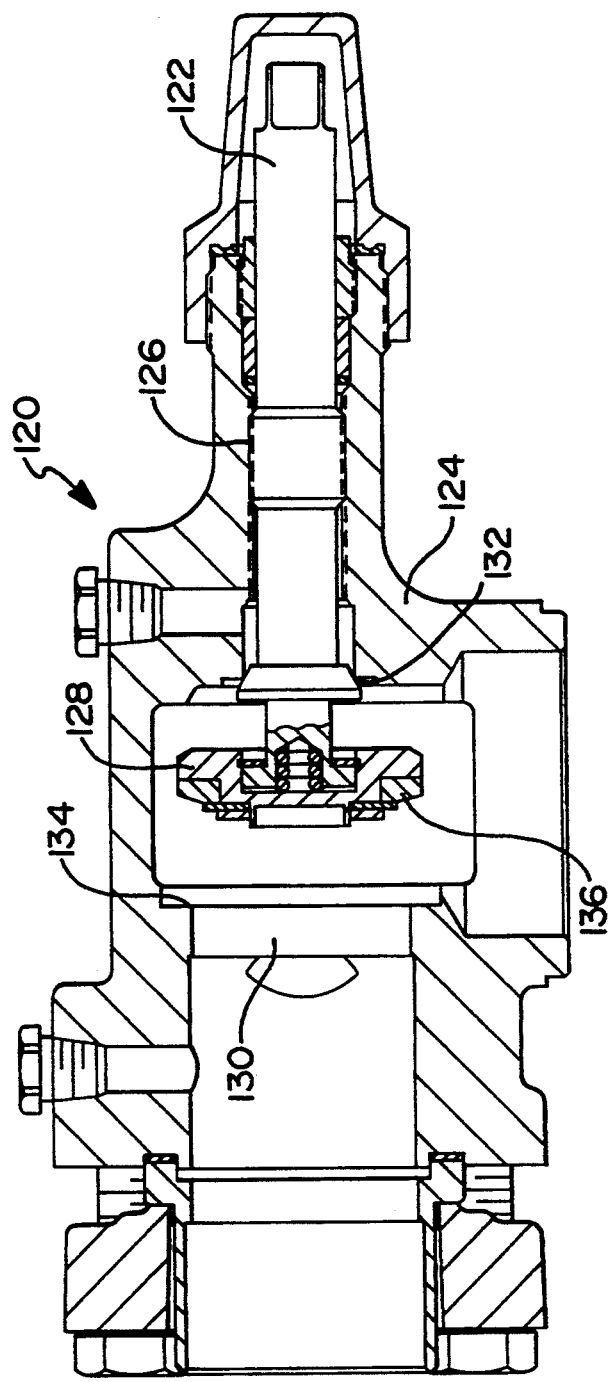

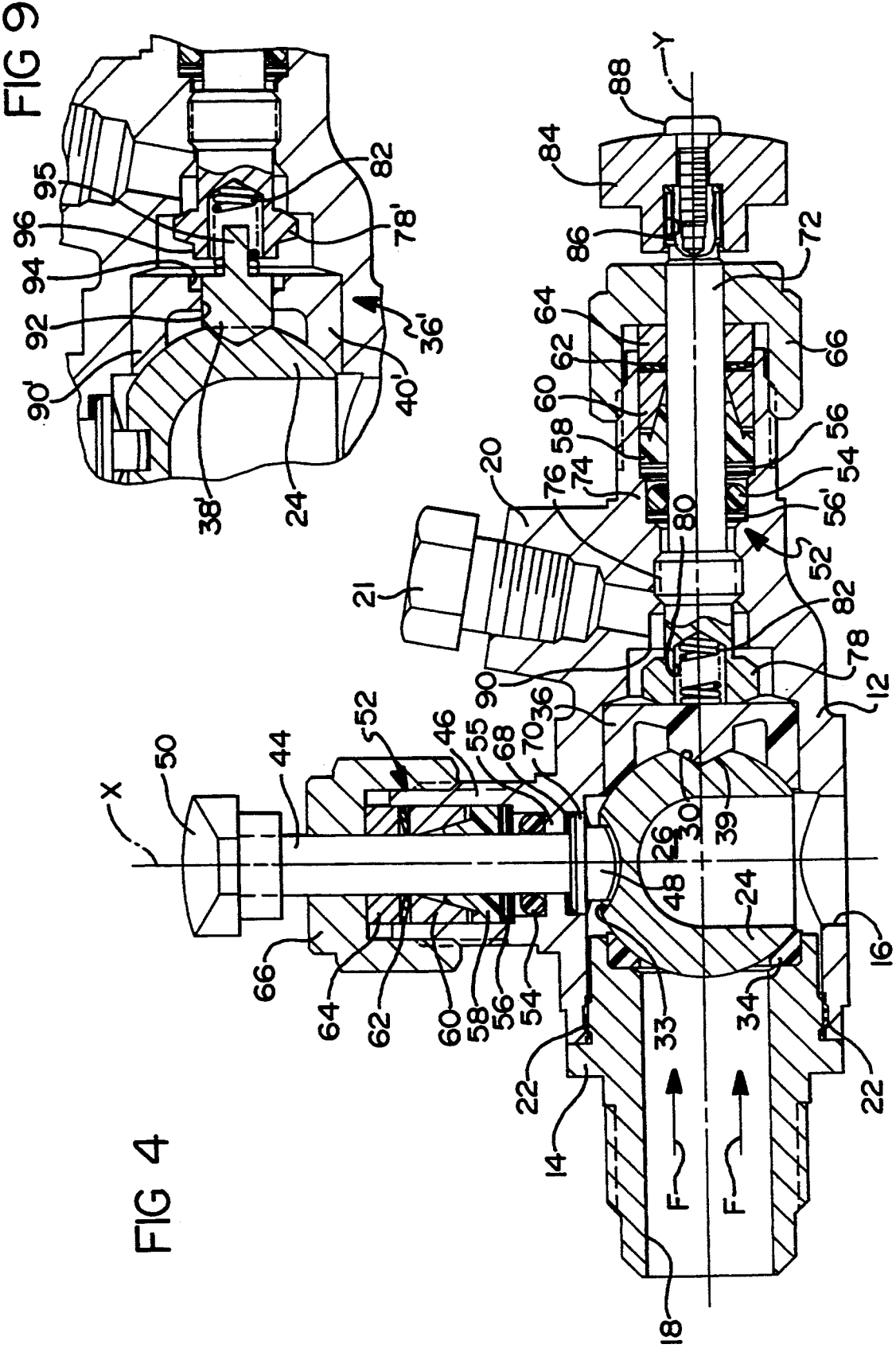

FLOW REFRIGERATION VALVE

BACKGROUND OF THE INVENTION

1. Field of the Invention

The present invention relates generally to valves for use in the fluid circuits of refrigeration and air-conditioning systems and, more particularly, to compressor valves and line service valves.

2. Discussion

Compressor valves and line service valves have been commonly used in refrigeration system fluid circuits to direct the flow of refrigerant through the circuit or retain the charge of liquid or gaseous refrigerant while isolating a portion of the circuit to facilitate the repair and/or replacement of system components or to perform general system maintenance. Examples of such valves are illustrated in prior art FIGS. 1 and 2. FIG. 1 shows a typical valve, such as one that is commonly made out of brass or steel which is used on compressors in the refrigeration and air-conditioning industry. The valve 100 includes a primary stem operator 102 that is disposed for linear movement within a valve body 104 by a threaded engagement, indicated at 106. Packing, generally indicated at 108, seals the valve 100 at the primary stem operator 102 while still allowing it to be rotatable in the valve body 104. At one end of the stem operator 102 is a globe-type plug or closure element 110 that is operable to completely block off a fluid passage 112. The primary stem operator 102 is linearly positionable between an opened position (as shown in FIG. 1) and a closed position (not shown) when rotated. In the opened position, the closure element 110 is backseated against the valve body 104 at location 114 and fluid is capable of flowing through the valve 100. In the closed position, the closure element 110 is advanced into fluid passage 112 and seated against valve body 104 at location 116. In this position, fluid flow through the valve 100 is prevented.

FIG. 2 depicts a cast iron compressor valve which is generally used with fluid line diameters greater than or equal to 2⅛". Very similar to the other compressor valve described above, the cast iron valve 120 includes a primary stem operator 122 that is disposed for linear displacement within a valve body 124 by a threaded engagement 126. Located at one end of the primary stem operator 122 is a globe-type closure element 128 which is operable to block off a fluid passage 130 through the valve. In the opened position, the closure element 128 is backseated against the valve body 124 at location 132 and fluid is capable of flowing through the valve 120. In the closed position, the closure element 128 is advanced into fluid passage 130 and seated against valve body 124 at location 134. In this position, fluid flow through the valve 120 is prohibited. The closure element 128 in the cast iron compressor valve 120 typically includes a plastic seat 136.

As shown in FIGS. 1 and 2 and described above, globe-type compressor and line service valves commonly include a threaded, reciprocating primary stem operator which serves to linearly displace a closure element within the fluid passage of a valve body between an opened and a closed position. When the valve is in the opened position, as is illustrated in FIGS. 1 and 2, the closure element is still located in the valve's fluid passage and, therefore, in the fluid flow stream. Because of this inherent design feature, blockage or interference within the fluid passage is created and, the fluid flow through the valve becomes turbulent, resulting in an increased pressure drop across the valve. The pressure drop, in turn, reduces the efficiency of the valve by allowing a significant amount of energy to be lost from the refrigeration circuit. Consequently, this energy loss presents a design constraint that must be addressed by refrigeration and air-conditioning system designers and engineers as they develop refrigeration and air-conditioning systems. Often, to compensate for the energy loss, system designers and engineers specify larger, over-sized compressors which exceed the thermodynamic requirements of the refrigeration system application. The use of such oversized compressors is inefficient and a waste of energy.

In the past, the refrigeration and air-conditioning industry has tolerated the occurrence of flow turbulence, pressure drop and the resulting energy loss which has been observed across refrigeration valves of the compressor and line service type. However, due to the increasing awareness of energy conservation and the attendant need to design and develop more energy efficient refrigeration and air-conditioning systems, it has become desirable to improve upon the efficiency of these types of refrigeration valves by reducing or eliminating the flow turbulence, pressure drop and associated energy loss experienced with them. In a typical application, for example, a series of compressors may be utilized in a refrigeration system such as the refrigeration section of a grocery store or supermarket, or the air-conditioning system of a large building. Improving the efficiency of compressor valves may enable fewer compressors to be used in a given application or allow a given number of compressors to work for shorter periods of time, or less than peak output thus saving not only significant amounts of operating costs in the form of electrical energy, but also significant equipment acquisition, repair and maintenance costs as well.

Further, it has been considered equally desirable that any improved efficiency valve maintain the ability to achieve a positive shut-off or seal as found in prior art globe-type valves wherein the application of a torque is translated into linear displacement. Presently, refrigeration valves having enhanced flow characteristics do not offer the feature of enhanced sealability.

It is, therefore, an object of the present invention to provide a valve for use in the fluid circuit of a refrigeration or air-conditioning system, such as a compressor or line service, that is significantly more energy efficient than present refrigeration valves by minimizing or substantially eliminating turbulence in the fluid flow path through the valve and the resulting pressure drop and energy loss. It is an additional object of the present invention to provide such an improved efficiency valve that also effectuates a positive seal.

SUMMARY OF THE INVENTION

Accordingly, the present invention is directed to a valve for use in the fluid circuit of a refrigeration or air-conditioning system, such as a compressor or line service valve that is significantly more energy efficient than present refrigeration valves. The valve incorporates a rotary ball member having a fluid passage size that is equal to or slightly greater than the size of the fluid line that it is intended to service. The valve is actuated by a ball stem that rotates through approximately 90° to open and close the valve. A lock stem is aligned on an alternate axis from the ball stem that is preferably collinear with a fluid line. A plunger is positioned within the valve to center the rotary ball member and insure that it is properly aligned with respect to fluid line connectors. Locator indentations and a groove in the rotary ball member operate to engage and guide a head of the plunger which is biased into engagement with the rotary ball member by a compression spring. When the lock stem is in the locked position, it effectuates positive sealing force between the rotary ball member and an annular ball seal and therefore makes the valve extremely suitable for fluid circuits such as refrigeration or air-conditioning systems wherein positive sealing against leakage of refrigerant is an important consideration.

The refrigeration valve of the present invention substantially reduces or eliminates the flow turbulence to thereby improve the energy efficiency over the prior art compressor and line service valves. The valve thus contributes to the overall efficiency increase in the refrigeration or air-conditioning system as a whole. The resultant enhanced flow efficiency of the present valve invention will permit greater refrigeration and air-conditioning system performance and improved energy efficiency ratings. This will, in turn, lower the system acquisition, operation and maintenance costs by virtue of the ability to reduce energy consumption, reduce the number of compressors required or utilize smaller sized compressors and other system components.

BRIEF DESCRIPTION OF THE DRAWINGS

The various features and advantages of the present invention will become apparent to one skilled in the art upon reading the following description of the preferred embodiment in which:

FIG. 1 depicts a transverse cross-sectional view of a first prior art compressor or line service valve in the opened position, of the type for use in the fluid circuit of a refrigeration or air-conditioning system;

FIG. 2 illustrates a transverse cross-sectional view of a second prior art compressor or line service valve in the opened position, of the type for use in the fluid circuit of a refrigeration or air-conditioning system;

FIG. 4 illustrates a transverse cross-sectional view of the improved flow refrigeration valve of FIG. 3, in the closed position;

FIG. 9 illustrates a transverse cross-sectional view of an improved flow refrigeration valve having a positive shut-off feature of the type for use in the fluid circuit of a refrigeration or air-conditioning system and constructed according to the principles of an alternate embodiment of the present invention.

DESCRIPTION OF THE PREFERRED EMBODIMENT

It should be understood from the outset that while the drawings and following discussion relate to a particular embodiment of the present invention, this embodiment merely represents what is presently regarded as the best mode of practicing the invention and other modifications may be made to the particular embodiment without departing from the spirit and scope of the invention.

Figure 5:
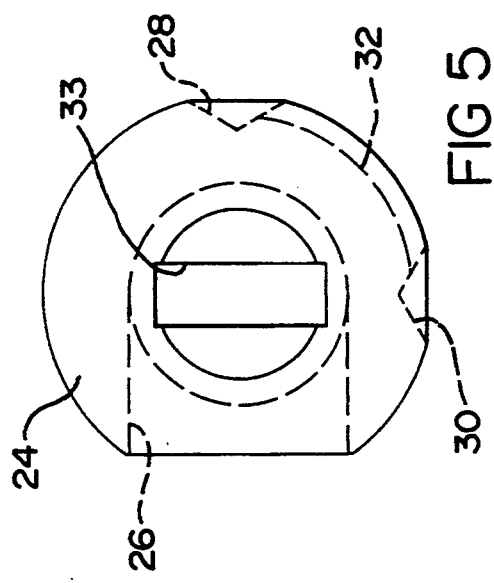
FIG. 5 is a plan view of a rotary ball member for the improved flow refrigeration valve of FIG. 3.
Figure 3:
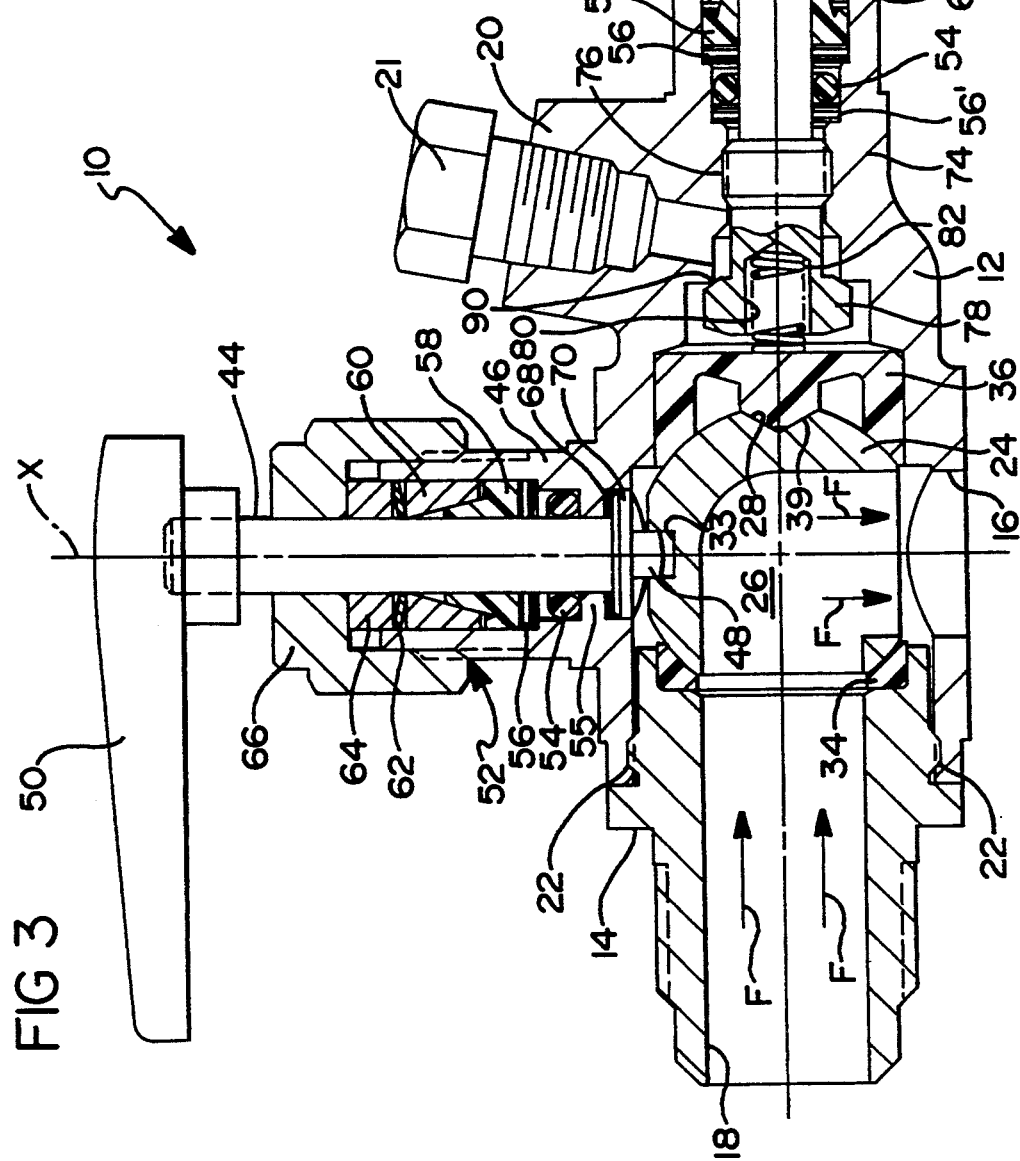
FIG. 3 shows, in the opened position, a transverse cross-sectional view of an improved flow refrigeration valve having a positive shut-off feature of the type for use in the fluid circuit of a refrigeration or air-conditioning system and constructed according to the principles of the present invention.

Referring now to FIGS. 3 through 8, an improved flow refrigeration valve 10 of the present invention is shown. As illustrated in FIG. 3, valve 10 is in the opened position to accommodate the unrestricted flow of fluid therethrough. While the flow direction of fluid through the valve has been indicated by flow arrows F for purposes of discussion, it should be understood that use of the present invention is not in any way limited to fluid flow in any particular direction. In contrast to FIG. 3, FIG. 4 shows valve 10 in the closed position where the positive shut-off feature of the present invention is engaged and fluid flow through the valve 10 is prohibited.

As shown in FIGS. 3 and 4, valve 10 generally incorporates a body section 12 and tail section 14. Valve 10 body section 12 and tail section 14 each include a fluid line connector portion 16 and 18, respectively, which serves to connect the valve 10 to the fluid circuit of a refrigeration system (not shown). Fluid line connector portions 16, 18 may be compatible with any of a variety of standard fluid line connections, including face seal fittings, flange fittings, flare fittings, pipe fittings and soldered fittings, to name a few, all of which are well-known in the industry. Body section 12 also includes a service port 20, having a pipe plug 21, that allows ready access to the fluid circuit to which the valve 10 is connected, such as for the addition or withdrawal of refrigerant to the system. Body section 12 and tail section 14 of valve 10 are alignably connectable such as by a threaded engagement, generally indicated at location 22, to form a unitary valve body after the installation and assembly of the valve's 10 components has been completed. A sealed connection between body section 12 and tail section 14 may be achieved by suitable known methods, such as welding, brazing or the like. Although the body of valve 10 has been described as having a multi-component construction including body section 12 and tail section 14, it should be appreciated that the body of valve 10 may also be manufactured as a single component.

Also shown in FIGS. 3 and 4, a generally spherically-shaped closure element or rotary ball member 24 is disposed between body section 12 and tail section 14. Rotary ball member 24 includes a ninety degree (90°) port or fluid passage 26 that is operable to communicate with both fluid line connector portions 16 and 18 when valve 10 is in the opened position, as shown in FIG. 3. Fluid passage 26 is sized to be substantially equal to or slightly greater than the size of the fluid lines that valve 10 is intended to service. Shown in greater detail in FIG. 5, rotary ball member 24 includes a first or opened locator indentation 28 and a second or closed locator indentation 30. In the preferred embodiment, the locator indentations 28 and 30 are conical in shape and spaced apart approximately ninety degrees (90°). A shallow channel or V-groove 32 extends circumferentially in the surface of rotary ball member 24 between locator indentations 28 and 30. Rotary ball member 24 also includes a slot 33 for receiving stem head 48 of ball stem 44, as will be further described herein.

While in the preferred embodiment body sections 12 and 14 and rotary ball member 24 of valve 10 are manufactured in a machining operation from brass, it is contemplated that other suitable precision valve construction materials such as steel, molded plastic, or the like could also be utilized.

Figure 7:
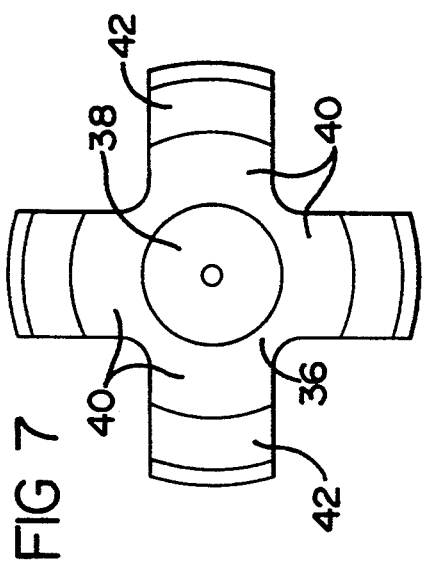
FIG. 7 is a plan view of the plunger of FIG. 6.
Figure 6:
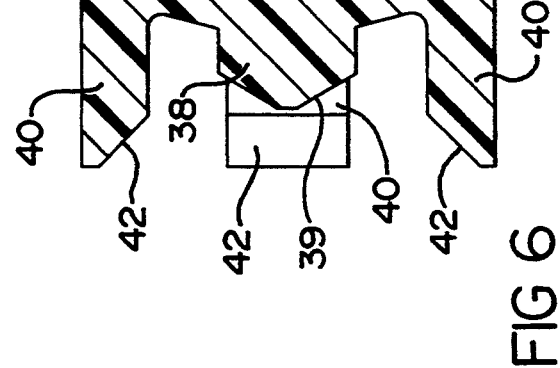
FIG. 6 is a transverse cross-sectional view of a plunger for the improved flow refrigeration valve of FIG. 3.

An annular ball seal 34 is disposed within tail section 14 adjacent rotary ball member 24. Ball seal 34 serves to provide a seat against which rotary ball member 24 may be positively sealed as shown in FIG. 4. Ball seal 34 may be made of any suitable material, carbon-filled teflon being one example. Disposed within body section 12 on an opposite side of rotary ball member 24 from ball seal 34, a plunger 36 acts to center rotary ball member 24 within body 12 so that fluid passage 26 is properly aligned with fluid line connector portions 16 and 18. Plunger 36, shown in more detail in FIGS. 6 and 7, has a locator head 38 and a plurality of fingers or extension portions 40 each having a pad 42 for engaging the surface of rotary ball member 24. Pad 42 may be suitably contoured to better engage the generally spherical surface of rotary ball member 24. FIG. 7 illustrates plunger 36 as including four extension portions 40, that are arranged in opposite pairs and are located on perpendicular axes so that each extension portion 40 is spaced approximately ninety degrees (90°) apart. However, a plunger 36 for use with the present invention may employ any suitable number of extension portions 40 which may be more or less than four. Plunger 36 may further be provided in various configurations which provide fluid communication between service port 20 and the fluid system lines to which valve 10 is connected when servicing valve 10. Locator head 38, which protrudes from the center of the plunger 36, has a tapered or conically-shaped surface 39 which is operable to engage locator indentations 28 and 30 and groove 32 in rotary ball member 24 as will be further described herein. Extension portions 40 and locator head 38, in combination with locator indentations 28 and 30 and groove 32 serve to enable plunger 36 to center rotary ball member 24 within body section 12 and align fluid passage 26 with fluid line connector portions 16 and 18. Plunger 36 is preferably manufactured from a strong, flexible material that is able to maintain its form, fit and function over a wide spectrum of operating temperatures, ranging from approximately minus forty degrees Fahrenheit (−40° F.) to about four hundred degrees Fahrenheit (400° F.). Thermoplastic polymer materials have proved suitable for this application.

An alternate two-piece plunger 36' embodiment for use in the valve 10 of the present invention is shown in FIG. 9. In this arrangement, locator head 38' and extension portions 40' are formed as separate components. As shown, locator head 38' extends through an aperture 92 and counter-bore 94 in extension portions 40'. The locator head 38' is operable to slide through aperture 92 thereby allowing locator head 38' to be independently biased against rotary ball member 24 by engagement with spring 82 at projection 95. Included with this alternate plunger 36' design, stem head 78' has a reduced diameter shoulder 96 which is larger than the aperture 92 but smaller than the counter-bore 94. The components of plunger 36' may be manufactured from a thermoplastic material, or alternately, if a harder plunger 36' is desired, the locator head 38' may be manufactured from a metal, such as brass, aluminium or steel, for example.

A primary stem operator or ball stem 44 is included in valve 10 and is operable to be moved between, and therefore provide valve 10 with, a first or opened position and a second or closed position as shown in FIGS. 3 and 4, respectively. Preferably, ball stem 44 is operable to rotate rotary ball member 24 through approximately ninety degrees (90°) of travel to open and close valve 10. Ball stem 44 extends along a first axis X and is rotatably supported in body section 12 at a first neck portion 46. A stem head 48 located at a first end of ball stem 44 engages slot 33 in rotary ball member 24 for rotating ball member 24 as ball stem 44 is rotated. The opposite end of ball stem 44 is connected to a first operating or ball handle 50. Packing, generally indicated at 52, is located between neck portion 46 and ball stem 44 and serves to seal neck portion 46 and therefore body section 12 at ball stem 44 while still allowing ball stem 44 to be rotatably supported therein. Packing 52 includes an O-ring 54 that is held in place by a flange 55 on body section 12 and a pack washer 56, a pack ring 58 that is preferably constructed of a thermoplastic material, a pack gland 60, a belleville washer 62 and a compression ring 64. A pack nut 66 is threaded onto neck portion 46 of body section 12 and acts to secure packing 52 within valve 10. An anti-friction ring 68 is disposed intermediate flange 55 and an annular lip 70 that is provided on ball stem 44 just above stem head 48. The preferred packing 52 arrangement described above raises the valve 10 to a zero-leakage system. However, alternate packing arrangements, such as an arrangement employing a single O-ring and a seal cap which is simply crimped over the top of the neck portions 46, 74 of the body section 12, for example, may be used with valve 10 if desired.

A secondary stem operator or lock stem 72 is also included in valve 10 and is operable to provide valve 10 with an unlocked and a locked or positively sealed position, as shown in FIGS. 3 and 4, respectively. In a first or unlocked position of lock stem 72, rotary ball member 24 may be freely rotated between the opened and closed positions, and in a second or locked position of lock stem 72 rotation of the rotary ball member 24 is prevented and a positive engagement or shut-off is effectuated between the rotary ball member 24 and the ball seal 34 to enhance the sealability of valve 10 and prevent the passage of refrigerant or other fluid therethrough. Lock stem 72 is rotatably supported in body section 12 at a second neck portion 74 and is aligned along a second axis Y that is preferably collinear with fluid line connection portion 18. Rotation of lock stem 72 is translated into linear displacement of the lock stem 72 within body section 12 and along axis Y by means of a threaded engagement, generally indicated at 76, between lock stem 72 and body section 12. Preferably for smaller valves 10, lock stem 72 may be positioned between the locked and unlocked positions with a total rotation of about one hundred eighty degrees (180°). However, it is recognized that several factors including the size of the valve 10, the amount of torque required to effectuate a positive seal in the valve 10, and the pitch of the threads 76 that connect lock stem 72 and body section 12, determine the total rotation of the lock stem 72 between the locked and unlocked positions. A first end of lock stem 72 includes a stem head 78 having an aperture or pocket 80. A compression spring 82 is disposed within pocket 80 and is biased between lock stem 72 and plunger 36. At the opposite end of lock stem 72 a second operating or lock handle 84 is removably connected. Engagement between mating splines on lock stem 72 and lock handle 84, generally indicated at 86, is secured by screw 88. It should be noted that in larger valves 10 the lock stem 72 may incorporate a square drive instead of lock handle 84 in order to facilitate the generation of greater amounts of torque, which are typically required to effectuate a positive seal in larger valves 10. As previously described with respect to ball stem 44, lock stem 72 also includes packing 52, which comprises O-ring 54, pack washer 56, pack ring 58, pack gland 60, belleville washer 62, compression ring 64, and pack nut 66. However, because lock stem 72, unlike ball stem 44, is operable for both rotational and linear displacement within body section 12, packing 52 for lock stem 72 includes a second pack washer 56'. Again, packing 52 serves to seal off second neck portion 74 and therefore body section 12 at lock stem 72 while still allowing lock stem 72 to be rotatable and linearly displaceable within the body section 12.

The improved flow refrigerant valve 10 of the present invention may be manufactured to accommodate various standard fluid line sizes and yet still incorporate many standard components. For example, all the components described above, including the body and stem operator assemblies with the exception of rotary ball member 24, could be standardized. In this case, different rotary ball members 24 having variously sized fluid passages 26 together with fluid line adapters (not shown) capable of adapting the various sized fluid lines to be connectable with standard fluid line connection portions 16 and 18, would be all that was necessary to modify provide valve's 10 for use with different fluid lines. Because the body 12 can be a single size and yet be adapted to service a variety of the fluid line sizes or diameters, the valve 10 can be economically produced. In addition, the valve 10 can be readily produced with a variety of standard "footprints", such as a two-bolt flange surface found on typical compressor valves or any of the other fluid line connections commonly utilized, which facilitates the ability to retro-fit the present valve invention into existing fluid circuits.

With reference again to FIGS. 3 and 9, the improved flow refrigeration valve 10 of the present invention is illustrated in the opened, unlocked position. In this position, the unobstructed and therefore substantially laminar flow of fluid is allowed through valve 10, as is exemplified by flow arrows F. In the unlocked position, rotation of rotary ball member 24 between the opened and closed positions is not prohibited. As shown, ball handle 50 and ball stem 44 are oriented in a first or opened position so that fluid passage 26 of rotary ball member 24 is in communication with both fluid line connector portions 16 and 18, and lock handle 84 and lock stem 72 are oriented in a first or unlocked position so that no shut-off force is being applied against the rotary ball member 24 to positively seat the rotary ball member against ball seal 34. In the opened, unlocked position, locator head 38, 38' of plunger 36, 36' fully engages opened locator indentation 28 on rotary ball member 24 by virtue of the bias of compression spring 82. Also, lock stem 72 is seated in a backseat position such that stem head 78, 78' is situated against body section 12 as shown at 90, thereby creating a clearance between the stem head 78 and the plunger 36. Although compression spring 82 remains nominally biased between lock stem 72 and plunger 36, 36' and is operable to maintain engagement between locator head 38, 38' and locator indentation 28, the clearance dimension that results when lock stem 72 is backseated is smaller than the depth of locator indentations 28 or 30, thus making it physically impossible for locator head 38, 38' of plunger 36, 36' to become fully disengaged from either locator indentation 28 or 30 or groove 32 when the lock stem 72 is in the unlocked position.

Turning now to FIG. 4, valve 10 is shown in the closed, locked position. In this position, rotary ball member 24 sealingly prevents the flow of fluid through the valve 10 and rotation of rotary ball member 24 between the opened and closed positions is prohibited. As shown, ball handle 50 and ball stem 44 are in a second or closed position so that fluid passage 26 of rotary ball member 24 is unable to communicate with fluid line connector portion 18. Also, lock handle 84 and lock stem 72 are in a second or locked position such that a positive shut-off is created between rotary ball member 24 and ball seal 34. In the locked position, locator head 38 of plunger 36 fully engages closed locator indentation 30 of rotary ball member 24. In addition, lock stem 72 is advanced to a position whereby the clearance between stem head 78 and plunger 36 is eliminated so that stem head 78 is brought into contact with plunger 36. When locked, a positive shut-off force to seat rotary ball member 24 against ball seal 34 is generated by stem head 78 and by compression spring 82, which is now substantially fully compressed between lock stem 72 and plunger 36. Although FIG. 4 illustrates that the valve 10 is closed when in the locked position, it should be appreciated that the valve may be locked in either the opened or closed position.

With reference to FIG. 9, the operation of the alternate plunger design 36' in the locked position can be understood. In the locked position, locator head 38' of plunger 36' fully engages closed locator indentation 30 of rotary ball member 24. Also, lock stem 72 is advanced to a position so that shoulder 96 of stem head 78' is brought into contact with a seat 98 on locator head 38' of plunger 36'. When locked, a positive shut-off force to seat rotary ball member 24 against ball seal 34 is generated by stem head 78' and by compression spring 82, which is now substantially fully compressed between lock stem 72 and plunger 36'.

Figure 8:
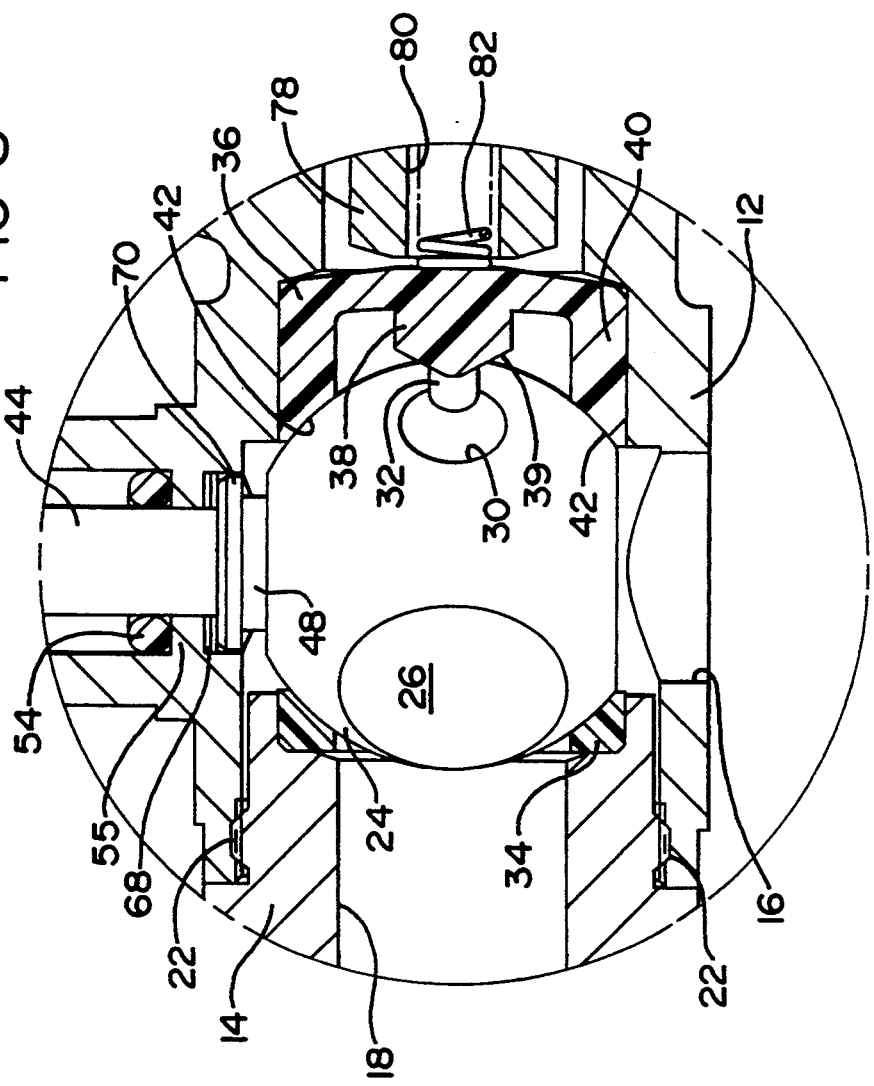
FIG. 8 is an enlarged detail view, partially in cross-section, of the rotary ball member of FIG. 5 and the plunger of FIG. 6 as the improved flow refrigeration valve of FIG. 3 is being rotated between an opened and a closed position.

FIG. 8 illustrates in enlarged detail valve 10 as the rotary ball member 24 is being moved between the opened and closed positions. As described above, in the unlocked position, a clearance exists between stem head 78 of lock stem 72 and plunger 36, wherein compression spring 82 is only nominally biased, and the rotary ball member 24 may be rotated to open or close the valve 10. As rotary ball member 24 is rotated from the opened to the closed position, for example, locator head 38 of plunger 36 is forced from its full engagement with opened locator indentation 28 and into full engagement with groove 32. Again, it should be noted that the clearance between stem head 78 and plunger 36 when plunger 36 is fully engaged in locator indentations 28 or 30 is smaller than the depth of the locator indentations. Thus, it is not physically possible for locator head 38 of plunger 36 to become disengaged from either locator indentation 28 or 30 or groove 32 when the lock stem 72 is in the unlocked position. As the locator head 38 moves from engagement with the locator indentation 28 into engagement with the groove 32, locator head 38, which is in the center of plunger 36, is flexed or cammed outward toward stem head 78 of lock stem 72, overcoming the bias of compression spring 82. Locator head 38 continues to ride in a "flexed" state along groove 32 until rotation of rotary ball member 24 is terminated at the closed position. Once at the closed position, locator head 38 returns to its normal, unflexed state as it "snaps back" and comes into full engagement with closed locator indentation 30. Alternate plunger embodiment 36' operates in a similar manner. However, because plunger 36' is a two-component design, it does not flex like plunger 36. Rather, as the rotary ball member 24 is moved between the opened and closed positions, locator head 38' simply is displaced linearly because locator head 38' is free to slide through extension portions 40'.

The arrangement described herein allows rotary ball member 24 to be continuously centered and aligned by plunger 36, 36', even during rotation of ball member 24. Also, locator indentations 28 and 30 serve to provide positive stop indicators for rotation of the ball stem 44 between the fully opened and fully closed positions. Because of this feature, the need for the inclusion mechanical stops built into the body section 12 which would prevent the rotation of the ball stem 44 beyond a certain point is eliminated. Consequently, it is anticipated that manufacture of the body section 12 of valve 10 can be entirely accomplished efficiently and economically on a multi-spindled trunion or similar machine.

The present invention is expected to significantly improve the fluid flow characteristics and improve the energy efficiency of compressor and line service valves for refrigeration and air-conditioning fluid circuits. In fact, flow testing of the valve 10 confirms an increase in flow efficiency. Comparison tests were conducted on an improved flow valve 10 of the present invention sized for a three-eighths inch (⅜") diameter fluid line as well as on other similarly sized prior known globe-type compressor valves. The tests were designed to measure flow rates through the valves at a given pressure drop and compare those values with the flow rate through a simple copper elbow at the same pressure drop. The copper elbow yielded a flow rate of 1.16 pounds per minute (lbs./min.), which provided the baseline against which flow rates through the present valve 10 and through prior art valves would be compared. The results of the tests revealed that the valve 10 of the present invention exhibited the closest flow rate, as high as 1.14 lbs./min., to the flow rate of the copper elbow. The value of 1.14 lbs./min. was measured when the fluid flow was directed in a direction through the valve 10 from fluid line connector portion 18 to fluid line connector portion 16. When the direction of fluid flow through the valve 10 was reversed, the flow rate was only slightly lower, 1.09 lbs./min. However, the flow rates through the prior art globe-type compressor valves generally ranged from 0.60 lbs./min. to only about 0.78 lbs./min., a significant efficiency difference. Only one other valve, similar to FIG. 1 and which is manufactured and sold as product no. A-16302 by Mueller Refrigeration Products, Co., a subsidiary of the assignee of the present invention, achieved a flow rate, 1.05 lbs./min, even close to the 1.14 lbs./min. flow rate of the valve 10. Even this difference is significant when considering that an improved efficiency of as little as 10% will have a major impact on the overall system efficiency, and thus, reduced energy consumption.

The present invention, unlike the prior art valves discussed above, does not inherently inhibit or obstruct flow of fluid through the valve. Consequently, flow turbulence is not generated and therefore no corresponding pressure drop and energy loss that results from such turbulence is present. The improved flow of the valve 10 likewise improves the valve's energy efficiency, which is expected to provide a significant economic impact upon the refrigeration and air-conditioning industry. The enhanced flow efficiency realized with the valve design of the present invention will allow for improved refrigeration and air-conditioning system performance and higher overall energy efficiency ratings.

It should be understood that while the present invention has been mainly discussed in the context of refrigeration and air-conditioning systems, those of ordinary skill in the art will readily appreciate that the valve 10 of the present invention may be utilized in any type of fluid circuit. Thus, the present invention is equally well-suited for use with any of a variety of commonly used fluids including air, water and steam, among others.

The present invention has been described in an illustrative manner. It is to be understood that the terminology which has been used is intended to be in the nature of words of description rather than of limitation. Many modifications or variations to the present invention are possible in light of the above teachings. Therefore, within the scope of the appended claims, the present invention may be practiced otherwise than as specifically described.

What is claimed is:

1. A valve for use in a fluid circuit, wherein said fluid circuit includes at least a first and a second fluid line, said valve comprising:

a valve body disposed between said first and said second fluid lines, said valve body having a first fluid line connection means for connecting said valve to said first fluid line and a second fluid line connection means for connecting said valve to said second fluid line;

a rotary ball member disposed within said valve body adjacent to a seal means, said ball member having an exterior surface and a fluid passage extending therethrough which is operable to communicate with both said first and said second fluid line connection means;

centering means disposed intermediate said rotary ball member and said valve body and being operable to center said rotary ball member within said valve body in a manner such that said fluid passage is aligned with said first and second fluid line connection means, said centering means comprising means for engaging said rotary ball member comprising a locator head and a plurality of extension portions;

a primary stem operator being rotatably supported within said valve body along a first axis and including means for engaging said rotary ball member, said primary stem operator being operable to rotate said rotary ball member between an opened position and a closed position, wherein in said open position said first and said second fluid lines are in communication with one another and in said closed position said first and second fluid lines are not in communication with one another; and a secondary stem operator being both rotatably supported and linearly displaceable within said valve body along a second axis, said secondary stem operator including means for engaging said centering means, said secondary stem operator being operable to impart an axial force against said centering means so as to cause to said rotary ball member to positively seat against said seal means.

2. A valve as recited in claim 1 wherein said locator head includes a tapered surface which engages said exterior surface of said rotary ball member and each said extension portion includes a pad which engages said exterior surface of said rotary ball member.

3. A valve as recited in claim 2 wherein said tapered surface is a conical surface.

4. A valve as recited in claim 2 wherein said pad is a contoured surface.

5. A valve as recited in claim 1 wherein said centering means is a two-component construction such that said locator head and said plurality of extension portions are separate components.

6. The valve recited in claim 1 wherein said second axis is collinear with one of said fluid line connection means.

7. The valve recited in claim 1 wherein said exterior surface of said rotary ball member further comprises first and second engagement means, said first engagement means being engageable with said primary stem operator and said second engagement means being engageable with said centering means.

8. The valve as recited in claim 7 wherein said second engagement means comprises at least one recess in said exterior surface of said rotary ball member which is operable to receive said locator head of said centering means.

9. The valve recited in claim 7 wherein said first engagement means comprises a slot means and said second engagement means comprises a plurality of conical indentations in said exterior surface of said ball member, and a V-shaped groove in said exterior surface of said ball member, which extends circumferentially between said conical indentations, said second engagement means being cooperative with said centering means so as to be engageable therewith.

10. The valve as recited in claim 9 wherein said secondary stem operator further comprises a stem shaft with a stem head at one end, said stem head having an aperture disposed therein for receiving a biasing means disposed within said aperture and said centering means wherein said biasing means imparts said axial force to said centering means to maintain said locator head in engagement with said conical indentations and with said V-shaped groove.

11. The valve recited in claim 9 wherein said conical indentations are spaced apart approximately 90° and said V-shaped groove extends across approximately 90° of the circumference of rotary ball member.

12. The valve recited in claim 1 wherein said rotary ball member is generally spherically shaped and said fluid passage comprises a substantially ninety degree port.

13. The valve recited in claim 1 wherein said first and said second fluid lines have a first diameter, said fluid passage having a diameter that is equal to or slightly greater than said first diameter.

14. The valve recited in claim 1 wherein the rotation of said rotary ball member between said opened position and said closed position encompasses approximately ninety degrees.

15. The valve recited in claim 1 wherein said valve body further comprises a service port for allowing access to said fluid circuit, and a pipe plug for providing a removeable seal for said service port and said centering means includes means for allowing fluid to communicate between said service port and said fluid circuit.

16. The valve recited in claim 1 further comprising: packing means disposed between a first neck portion of said valve body and said primary stem operator, and packing means disposed between a second neck portion of said valve body and said secondary stem operator, each said packing means comprising an O-ring, at least one pack washer, a pack ring, a pack gland, a belleville washer, a compression ring and a pack nut.

17. A valve as recited in claim 1 wherein said first or said second fluid line comprises a compressor.

18. The valve as recited in claim 1 wherein valve body comprises a first body section and a second body section, said first body section having first means for connecting said valve to said first fluid line and said second body section having second means for connecting said valve to said second fluid line, said first body section and said second body section being joined to form a unitary valve body.

19. The valve as recited in claim 1 wherein said seal means is disposed within said first body section intermediate said rotary ball member and said first means for connection said valve to said first fluid line.

20. A valve as recited in claim 1 wherein said seal means is an annular seal ring.

21. A compressor valve or line service valve for use in the fluid circuit of a refrigeration or air-conditioning system, said refrigeration valve comprising:
a valve body including a first body section and a second body section, each said body section including fluid line connection means for connecting said valve to said fluid circuit;
a generally spherically shaped rotary ball member being disposed within said valve body and being rotatable between an opened position and a closed position, said rotary ball member having an exterior surface including first and second engagement means and a continuous fluid passage extending therethrough which is operable to communicate with a first fluid line and a second fluid line of said fluid circuit which are connected to said fluid line connector means;
seal means disposed intermediate said rotary ball member and said valve body;
a primary stem operator rotatably supported in said valve body along a first axis and being engageable with said first engagement means of said rotary ball member to rotate said rotary ball member between said opened position and said closed position;
plunger means disposed intermediate said rotary ball member and said valve body and being operable to center said rotary ball member within said valve body in a manner such that said fluid passage is aligned with said fluid line connector means, said plunger means including means for engaging said second engagement means of said rotary ball member to guide said ball member as it is rotated between said opened and said closed positions;
a secondary stem operator comprising a stem head at one end, said stem head having an aperture therein, a biasing means being disposed within said aperture intermediate said stem head and said plunger means, said secondary stem operator being rotatably supported and linearly displaceable in said valve body along a second axis which is collinear with one of said fluid lines and wherein said secondary stem operator is operable to seat said rotary ball member against said seal means when said rotary ball member is in said opened or said closed position.

22. The valve recited in claim 21 wherein the rotation of said rotary ball member between said first position and said second position encompasses an angle of approximately ninety degrees.

23. The valve recited in claim 21 wherein said fluid passage of said rotary ball member comprises a substantially ninety degree port.

24. The valve recited in claim 21 wherein said first engagement means comprises a slot and said second engagement means comprises a plurality of locator indentations.

* * * * *

UNITED STATES PATENT AND TRADEMARK OFFICE
CERTIFICATE OF CORRECTION

PATENT NO. : 5,397,100
DATED : March 14, 1995
INVENTOR(S) : Kent A. Miller

It is certified that error appears in the above-indentified patent and that said Letters Patent is hereby corrected as shown below:

On the Title Page, the Title;
"In the Title";
"Flow Refrigeration Valve" should be ---Valve---.

Column 1, Line 1;
"In the Title";
"Flow Refrigeration Valve" should be ---Valve---.

Signed and Sealed this

Sixth Day of June, 1995

Attest:

BRUCE LEHMAN

Attesting Officer　　　Commissioner of Patents and Trademarks